(12) United States Patent
Schoenbauer et al.

(10) Patent No.: US 6,774,576 B2
(45) Date of Patent: Aug. 10, 2004

(54) SWITCH MODE ENERGY RECOVERY FOR ELECTRO-LUMINESCENT LAMP PANELS

(75) Inventors: Steve Schoenbauer, Colorado Springs, CO (US); Dan Fleming, Colorado Spings, CO (US); Fernando R. Martin-Lopez, Colorado Springs, CO (US)

(73) Assignee: Toko, Inc. (JP)

( * ) Notice: Subject to any disclaimer, the term of this patent is extended or adjusted under 35 U.S.C. 154(b) by 120 days.

(21) Appl. No.: 10/261,915

(22) Filed: Sep. 30, 2002

(65) Prior Publication Data

US 2003/0057874 A1 Mar. 27, 2003

Related U.S. Application Data

(62) Division of application No. 09/797,128, filed on Mar. 1, 2001, now Pat. No. 6,459,210.

(51) Int. Cl.⁷ .............................................. G09G 3/10
(52) U.S. Cl. ................ 315/169.3; 315/225; 315/241 R; 315/209 R
(58) Field of Search .............................. 315/169.3, 225, 315/224, 209 R, 241 R, 240, 246

(56) References Cited

U.S. PATENT DOCUMENTS

| | | | | |
|---|---|---|---|---|
| 5,581,160 A | * | 12/1996 | Fujita | 315/169.3 |
| 5,686,797 A | * | 11/1997 | Sanderson | 315/209 R |
| 5,969,484 A | * | 10/1999 | Santi et al. | 315/247 |
| 6,072,477 A | * | 6/2000 | Ueno | 345/211 |
| 6,181,080 B1 | * | 1/2001 | Schleicher | 315/248 |

* cited by examiner

*Primary Examiner*—Tuyet T. Vo
(74) *Attorney, Agent, or Firm*—William E. Hein

(57) ABSTRACT

High voltage and low voltage switch mode circuits and methods serve to recover the charge stored on electro-luminescent lamp panels that would otherwise be dissipated during the discharge cycle of a drive circuit. The high voltage circuits and methods operate to transfer the charge to the high voltage rail, while the low voltage circuits and methods operate to transfer the charge to the source of low drive voltage.

5 Claims, 12 Drawing Sheets

SWITCH MODE ENERGY RECOVERY FOR ELECTRO-LUMINESCENT LAMP PANELS

REFERENCE TO RELATED APPLICATION

This application is a divisional application of prior application Ser. No. 09/797,128 filed on Mar. 1, 2001, now issued at U.S. Pat. No. 6,459,210.

FIELD OF THE INVENTION

This invention relates generally to electro-luminescent lamp panels and, more particularly, to the recovery of energy stored in these panels that is otherwise dissipated during the discharge cycle of a drive circuit.

BACKGROUND AND SUMMARY OF THE INVENTION

Electro-luminescent lamps act as capacitors, electrically. These lamps store energy, as do all capacitors, in the form of an electrical voltage charge. In the normal electro-luminescent lamp driver circuit, this charge is dissipated, and therefore lost, during the discharge cycle of operation.

Electro-luminescent lamp driver circuits are well known in the prior art, exemplary of which are the Supertex HV803 and the Toko TK659XX. A typical one of these circuits is illustrated in FIG. 1. In that circuit, components L1, S0, D1, and C1 constitute a high voltage boost or step-up converter which receives a low voltage (less than 6 volts) and boosts it to between 20 and 100 voltas on the capacitor C1. Components S1, S2, S3, and S4 constitute a an H-bridge circuit that is used to commutate the high DC voltage on capacitor C1 into a high AC voltage across an electro-luminescent lamp capacitor (C lamp) that is about twice the DC voltage on capacitor C1. This AC voltage charges and discharges the capacitor C lamp, with the energy stored in the capacitor C lamp being dissipated in components S3 and S4 of the H-bridge during the discharge cycle.

It would be advantageious to recover this energy, existing in the form of charge at high voltage, from the electro-luminescent lamp capactior C_lamp, and reuse it, thus making the entire electro-luminescent lamp driving system more efficient. Accordingly, the present invention is directed to circuitry required to implement the recovery of this otherwise lost energy, which is significant in the case of large electro-luminescent lamps that are driven to higher voltages.

DETAILED DESCRIPTION OF THE INVENTION

Described below are a number of high and low voltage methods for the recovery of otherwise dissipated energy from electro-luminescent lamp panels. The high voltage methods generally return energy to the high voltage node of the electro-luminescent lamp driver circuit or to the electro-luminescent capacitor, while the low voltage methods return energy to a low voltage source.

Figure 2:
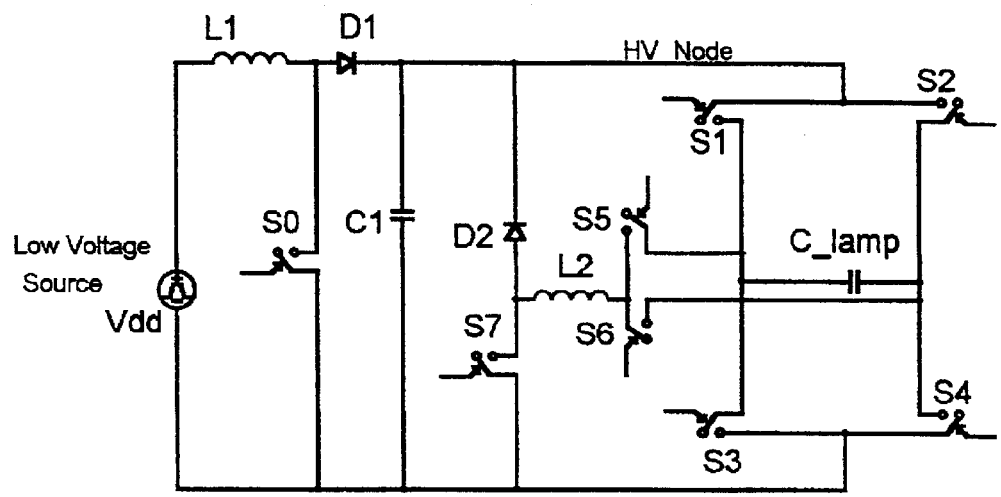
FIG. 2 is a schematic diagram of an electro-luminescent lamp driver circuit employing a high voltage switch mode method of charge recovery, in accordance with one embodiment of the present invention.
Figure 5:
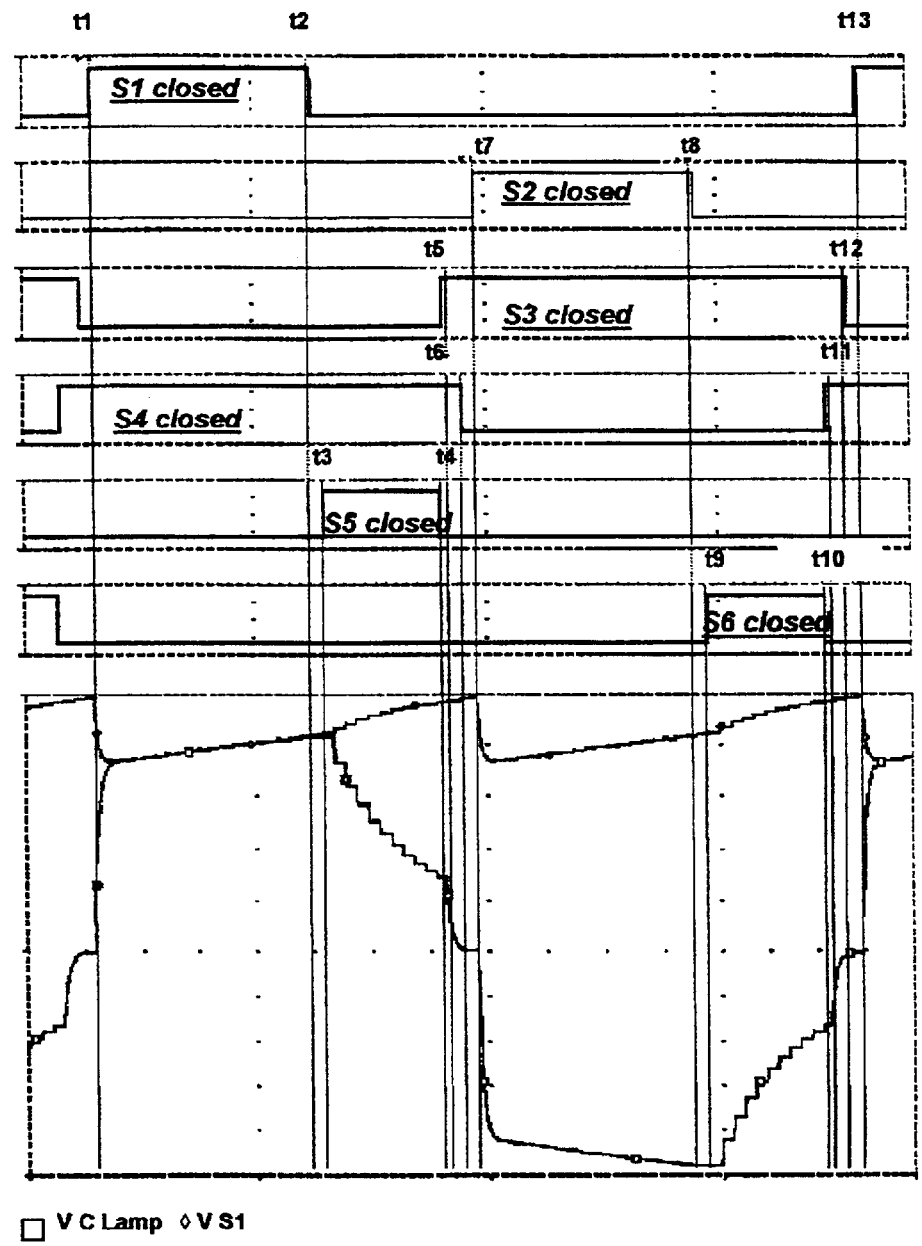
FIG. 5 is a waveform diagram illustrating typical waveforms generated by the electro-luminescent lamp driver circuits of FIGS. 2–4.

Referring now to FIG. 2, there is shown an electro-luminescent lamp driver circuit employing a high voltage switch mode method of charge recovery in which a second boost converter is employed to discharge the voltage on the electro-luminescent lamp and return energy to a capacitor C1. This method increases the peak-to-peak voltage to the electro-luminescent lamp. An H-bridge operates normally to charge a capacitor C_lamp, as shown in the waveform diagram of FIG. 5. In discharging capacitor C_lamp, only switch S1 is opened, while switch S5 is closed, thereby applying the voltage on capacitor C_lamp to the input of the boost converter that employs components L2, S7, and D2. The switching frequency and duty cycle of switch S7 is selected to effect the most efficient transfer of energy from capacitor C_lamp to capacitor C1. After most of the charge on capacitor C_lamp is transferred, switch S5 opens and switch S3 closes, thereby discharging capacitor C_lamp completely. The charging cycle is repeated on the other side of the H-bridge by opening switch S4 and closing switch S6, while operating switch S7 as described above. After capacitor C-lamp is nearly discharged, switch S6 opens and switch S4 closes, following which switch S3 opens and switch S1 closes, thus beginning another AC voltage cycle of capacitor C_lamp. The advantage of charge recovery is realized as an increased rate of rise in the voltage on capacitor C1, as shown in the waveform diagram of FIG. 5, when switches S5 or S6 are closed and capacitor C_lamp is being discharged.

Figure 3:
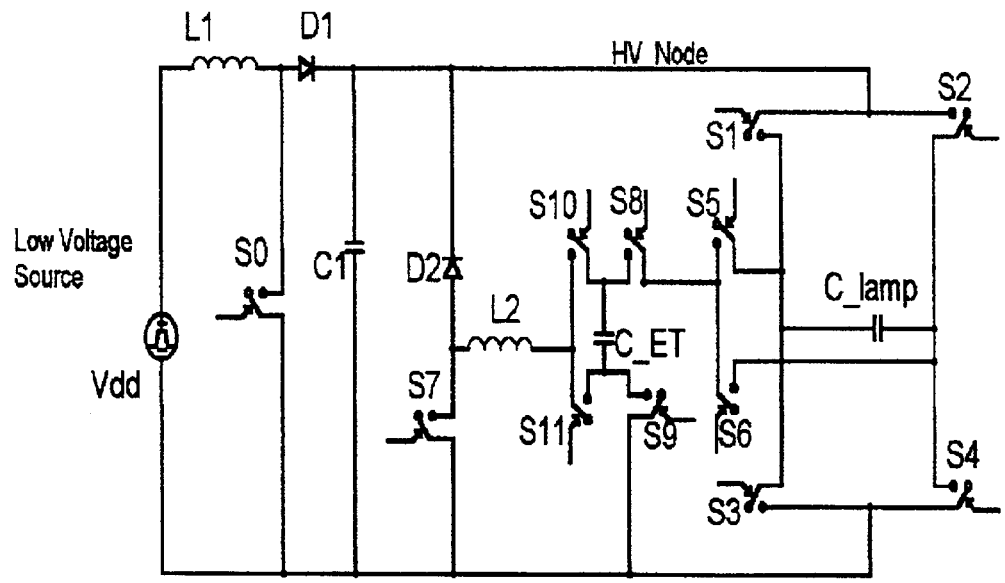
FIG. 3 is a schematic diagram of an electro-luminescent lamp driver circuit employing an energy transfer capacitor, in accordance with another embodiment of the present invention.

Referring now to FIG. 3, there is shown an electro-luminescent lamp driver circuit employing an alternative high voltage switch mode method of charge recovery in which an energy transfer capacitor C_ET is provided to the second boost converter to control the rate of discharge of the electro-luminescent lamp panel voltage. Switches S8–S11 are controlled in a way similar to that described below in connection with FIGS. 9–11.

Figure 4:
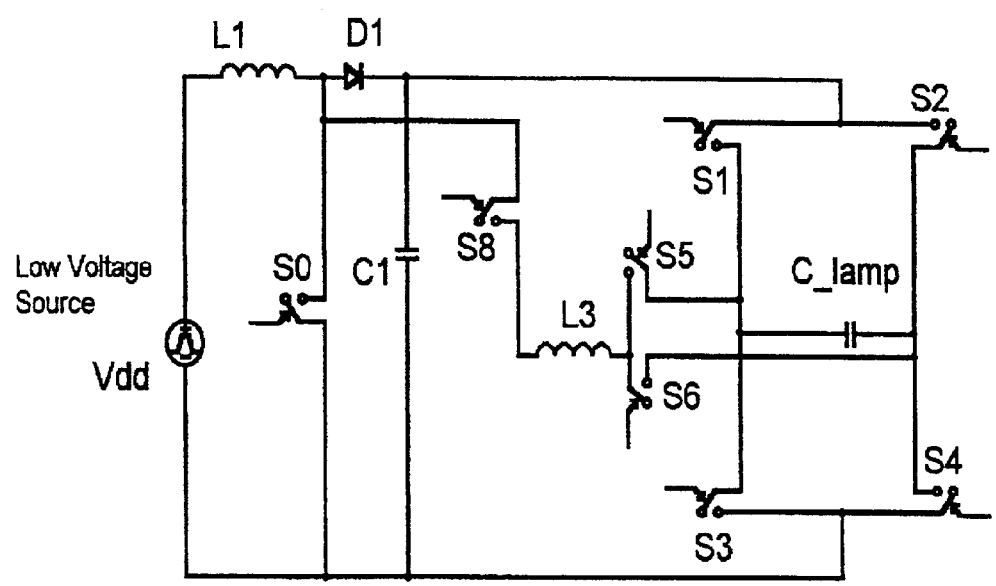
FIG. 4 is a schematic diagram of an electro-luminescent lamp driver circuit employing an integrated high voltage switch mode method of charge recovery, in accordance with another embodiment of the present invention.

Referring now to FIG. 4, there is shown an electro-luminescent lamp driver circuit integrated with the main boost converter as an alternative high voltage switch mode method of charge recovery. This circuit realizes a saving in the number of external components, but requires synchronization of timing between the charge recovery circuit and the main boost converter. Inductors L1 and L3 may utilize the same magnetic core. Operation of the circuit of FIG. 4 is similar to that of the electro-luminescent lamp driver circuit of FIG. 2 with regard to switches S0–S6. However, there is a difference with regard to operation of switch S8, in that it must be synchronized with switch S0. Switch S8 must close after switch S0 closes, in order that the current beginning to flow through inductor L3 flows through switch S0 rather than back through inductor L1 to the low voltage supply Vdd. In addition, switch S8 must remain closed for a short time after switch S0 open to insure that the voltage at the anode of diode D1 has decayed to a level below low voltage supply Vdd. Switch S8 should then open.

Figure 6:
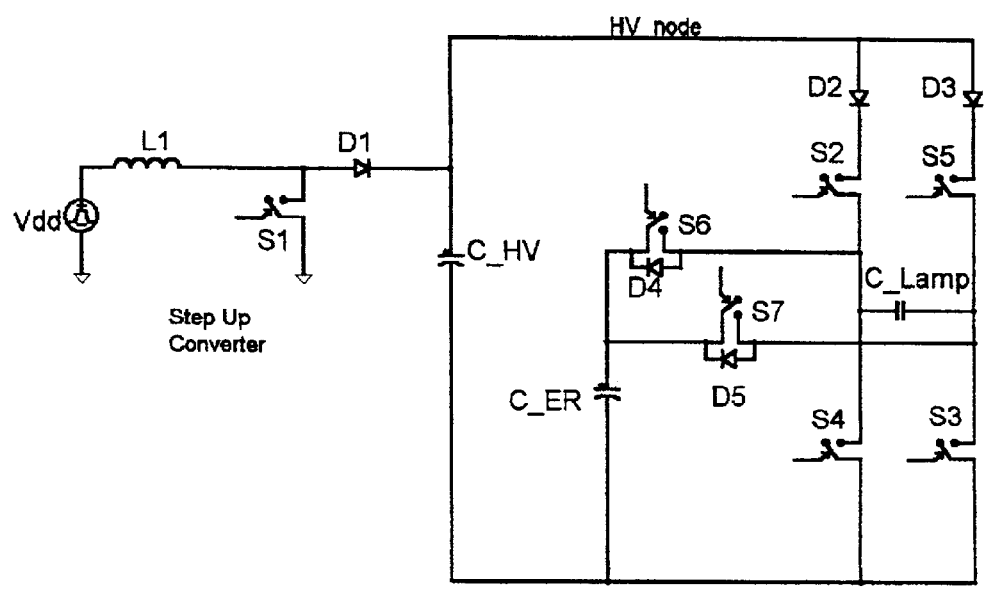
FIG. 6 is a schematic diagram of an electro-luminescent lamp driver circuit employing charge pump energy recovery, in accordance with another embodiment of the present invention.
Figure 7:
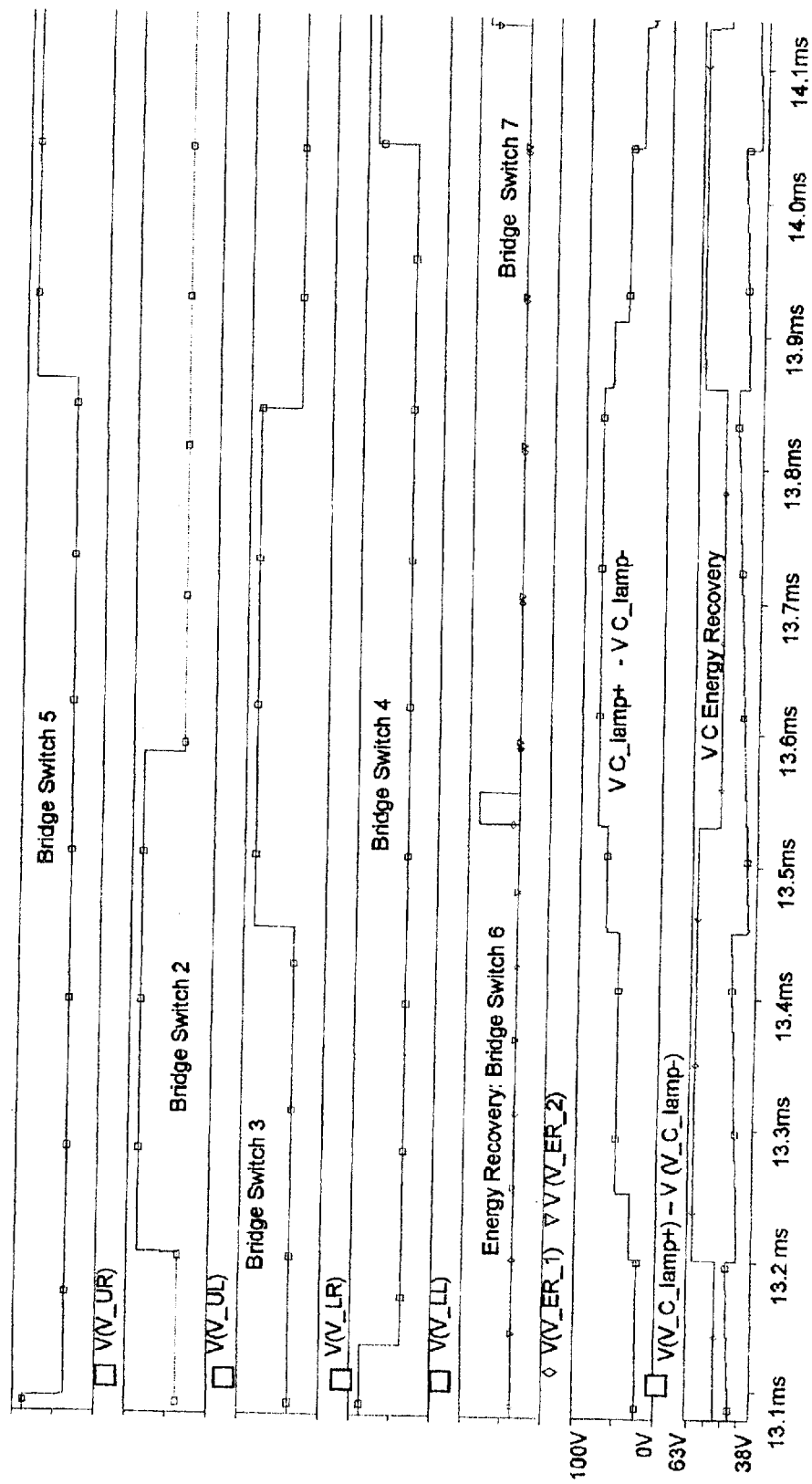
FIG. 7 is a waveform diagram illustrating simulated waveform results obtained from the electro-luminescent lamp driver circuit of FIG. 6.

Referring now to FIG. 6, there is shown an electro-luminescent lamp driver circuit employing a holding capacitor C_ER to which energy is transferred in a particular cycle and from which energy is returned to capacitor C_lamp in a later cycle. Considering an initial state of this circuit in which switches S2 and S3 are closed, while all other switches are open, capacitor C_lamp is charged to a voltage at high voltage rail HV_node by a current flowing through diode D2 and switches S2 and S3. Next, switches S2 and S3 open, and switch S5 closes, thereby tying the right terminal of capacitor C_lamp essentially to the high voltage rail HV_node and moving the voltage at the left terminal of capacitor C_lamp above the voltage at high voltage rail HV_node by some amount. During this phase, diode D4 becomes forward biased, and a current flows from capacitor C_lamp into energy recovery capacitor C_ER. The voltage on capacitor C_ER continues to rise until an equilibrium voltage is reached. Switch S4 now closes, while switch S5 remains closed. Capacitor C_lamp is then charged to the voltage at the high voltage rail HV_node by a current flowing through diode D3 and switches S4 and S5. Next, a portion of the energy in capacitor C_ER is returned to capacitor C_lamp by closing switch S7. Operation of the circuit of FIG. 6, as described above, is illustrated in the simulated waveform results diagram of FIG. 7.

Figure 8:
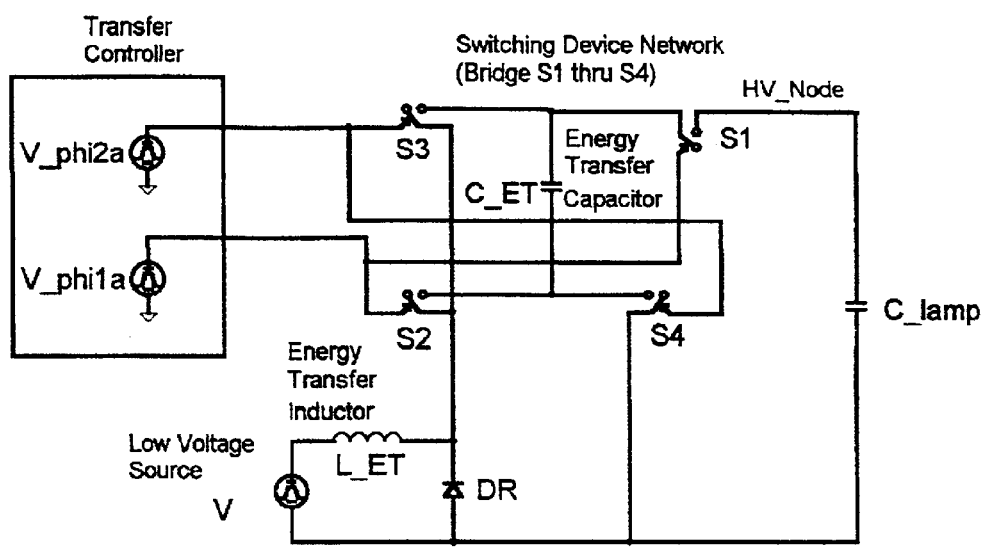
FIG. 8 is a schematic diagram of an electro-luminescent lamp driver circuit employing a low voltage switch mode method of energy recovery, in accordance with another embodiment of the present invention.

Referring now to FIG. 8, there is shown an electro-luminescent lamp driver circuit employing a low voltage switch mode method of charge recovery in which a current is returned to the low voltage supply V by transferring energy from the electro-luminescent lamp panel through a switched capacitor/inductor arrangement. This circuit is referred to as a current limited circuit, since the return current is set by the topology and clock rate of the circuit. A group of four switching cycles are used repetitively to accomplish a transfer of energy between the electro-luminescent lamp panel and the low voltage supply V.

Initially, a charge or voltage exists on the capacitor C_lamp. This charge may have been deposited earlier by an H-bridge circuit similar to that descrbed above, or by some other crcuit configuration. An energy transfer capacitor C_ET is assumed to have no initial charge. An energy tranfer inductor L_ET may or may not have an initial current.

Figure 9:
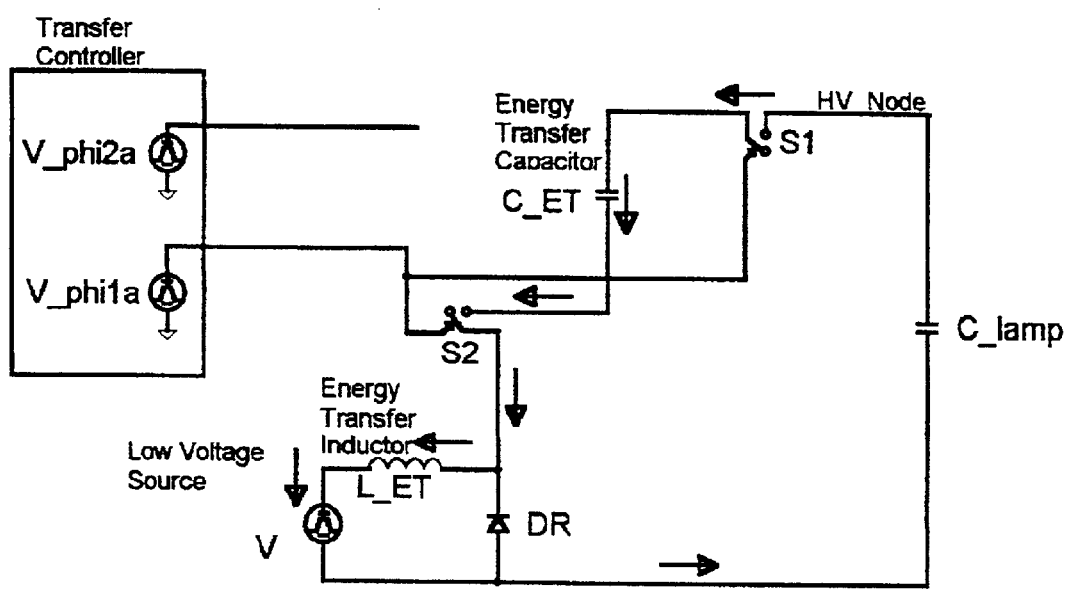
FIG. 9 is a schematic diagram illustrating the circuit equivalent of the circuit of FIG. 8 during a first cycle of operation.

Referring now to FIG. 9, during the first cycle of operation of the circuit of FIG. 8, switches S1 and S2 close to allow current to begin flowing from capacitor C_lamp through switch S1, capacitor C_ET, switch S2, inductor L_ET, and the low voltage supply V. During this cycle, energy is being delivered to the low voltage supply V by means of a current flowing into its positive terminal.

Figure 10:
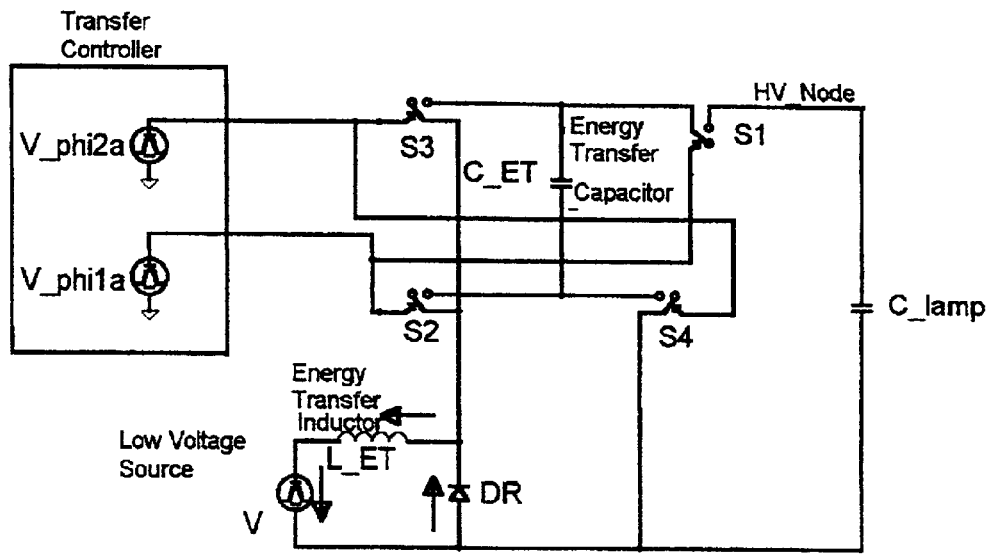
FIG. 10 is a schematic diagram illustrating the circuit equivalent of the circuit of FIG. 8 during second and fourth cycles of operation.

After some period of time, a transfer controller opens switches S1 and S2, to begin a second cycle of operation of the circuit of FIG. 8, as illustrated in FIG. 10. At this point, a charge has been developed on capacitor C_ET, and a current is flowing in inductor L_ET. This current continues to flow in a recirculation diode DR, while energy supplied by inductor L_ET is being delivered to the low voltage supply V. The charge on capacitor C_ET and energy ($0.5\ CV^2$) are relatively constant during this second cycle of operation.

Figure 11:
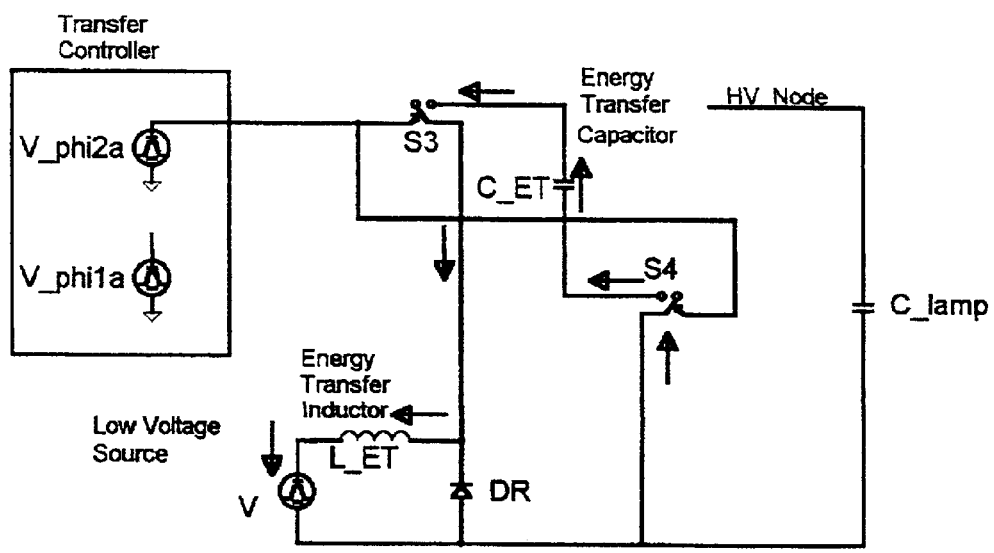
FIG. 11 is a schematic diagram illustrating the circuit equivalent of the circuit of FIG. 8 during a third cycle of operation.

During a third cycle of operation of the circuit of FIG. 8, illustrated in FIG. 11, the transfer controller closes switches S3 and S4 to cause a current flow from capacitor C_ET through switch S3, inductor L_ET, switch S4, and back to capacitor C_ET. The energy stored in capacitor C_ET is now being delivered through inductor L_ET to the low voltage supply V.

During a fourth cycle of operation of the circuit of FIG. 8, illustrated in FIG. 10, the transfer controller opens switches S3 and S4. At this point, the voltage on capacitor C_ET is zero. The current flowing through inductor L_ET continues to flow in recirculation diode DR, resulting in a transfer of energy from inductor L_ET to the low voltage supply V.

The four cycles described above are repeated to incrementally transfer energy from capacitor C_lamp to the low voltage supply V. Each incremental transfer is approximated by the expression $E=0.5*C\_ET*(V\_el)^2$. In some implementations of the circuit of FIG. 8, only the first and third cycles are performed, back to back.

The voltage on capacitor C_lamp drops incrementally following each group of four cycles by the amount Vint* (C_lamp/(C_lamp+C_ET)). By regulating how often each group of four cycles is repeated, the transfer controller can adjust the rate of decay of the voltage on capacitor C_lamp. Capacitor C_ET facilitates this control at practical switching frequencies. For example, without capacitor C_ET and using only inductor L_ET, the switch network may need to operate at approximately twenty times the normal frequency to achieve the same discharge profile of capacitor C_lamp.

Figure 12:
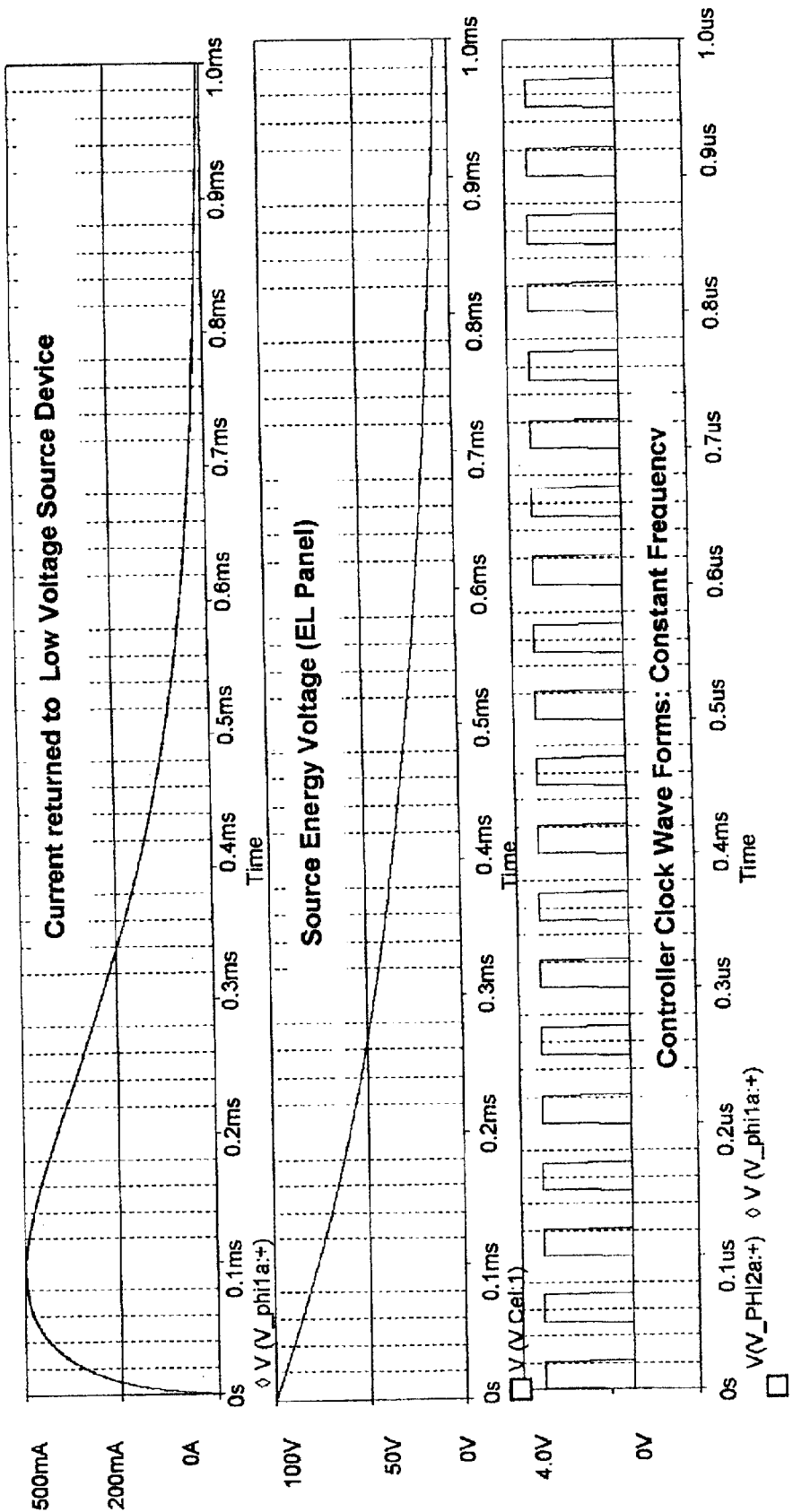
FIG. 12 is a waveform diagram illustrating the simulation of electro-luminescent lamp panel energy being returned to the low voltage source as a current, with the frequency of the transfer controller clock being constant with time.

Referring now to FIG. 12, there is shown a simulation during a 1 msec. time duration of the operation of the circuit of FIG. 8, given certain parameters. The initial charge on the 80 nf. capacitor C_lamp is 100 volts. The transfer controller is a dual clock source, with the two outputs being 180 degrees out of phase. The clock frequency is constant at 1 mHz. The upper waveform shows the current flow back into the low voltage source V. The center waveform shows the exponential voltage decay on capacitor C_lamp as energy is being removed from it.

Figure 13:
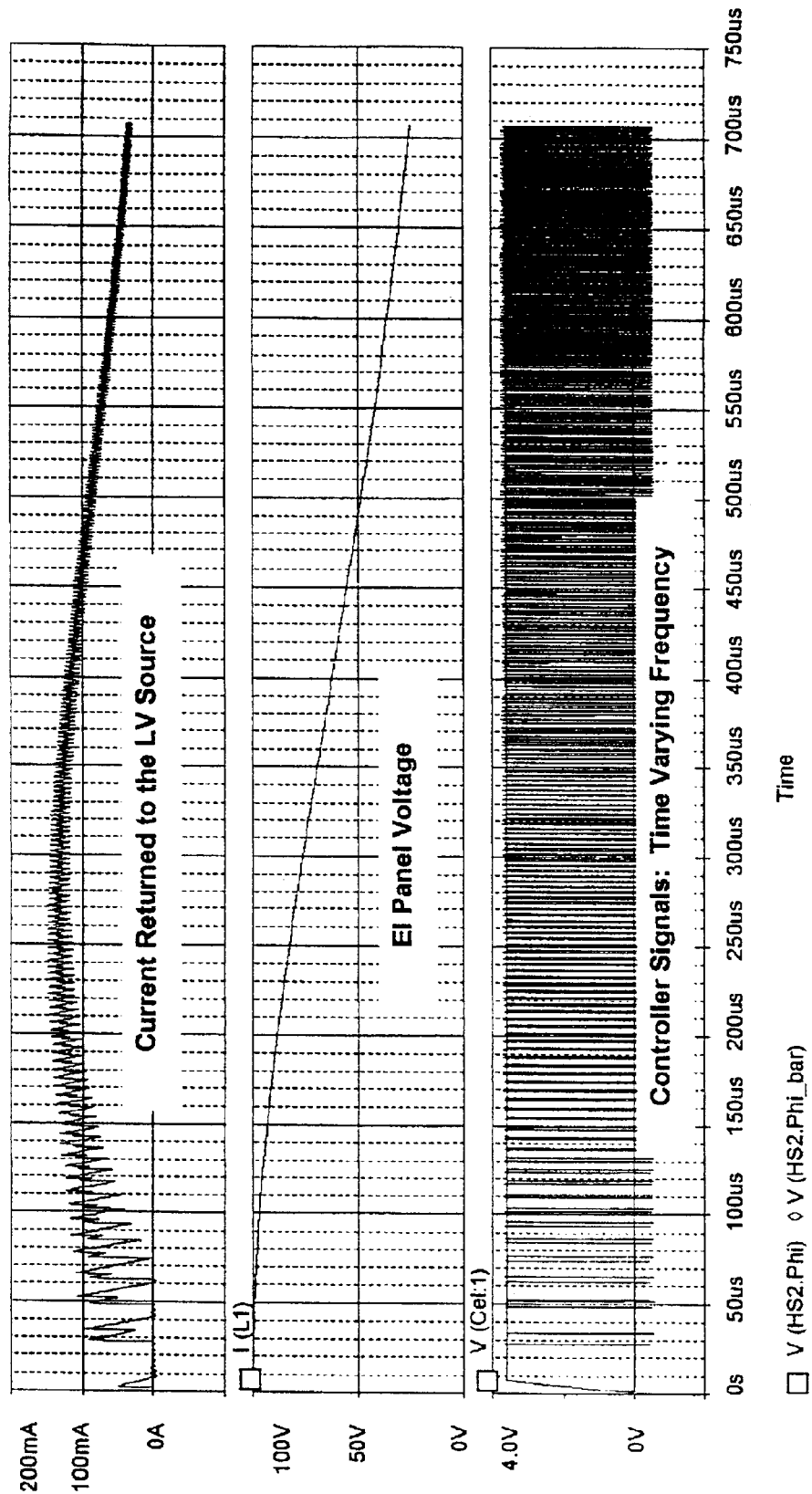
FIG. 13 is a waveform diagram illustrating the simulation of electro-luminescent lamp panel energy being returned to the low voltage source as a current, with the frequency of the transfer controller clock increasing with time.

Alternatively, the frequency of the transfer controller can vary with time, thus producing a different waveform of the discharge of capacitor C_lamp, as illustrated in FIG. 13. The waveforms of FIG. 13 resulted from the same circuit as those of FIG. 12, except that the frequency of transfer controller increased linearly with time, thus producing a convex waveform of voltage decay on capacitor C_lamp as energy is being removed from it.

Figure 1:
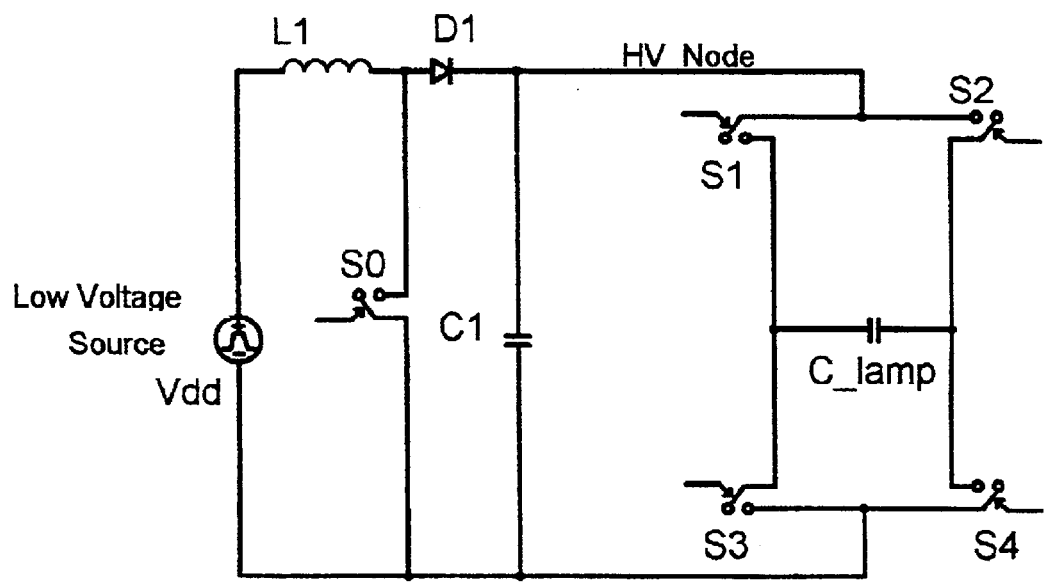
FIG. 1 is a circuit diagram of a typical prior art electro-luminescent lamp driver circuit that is unable to recover charge from the electro-luminescent lamp capacitor.
Figure 14:
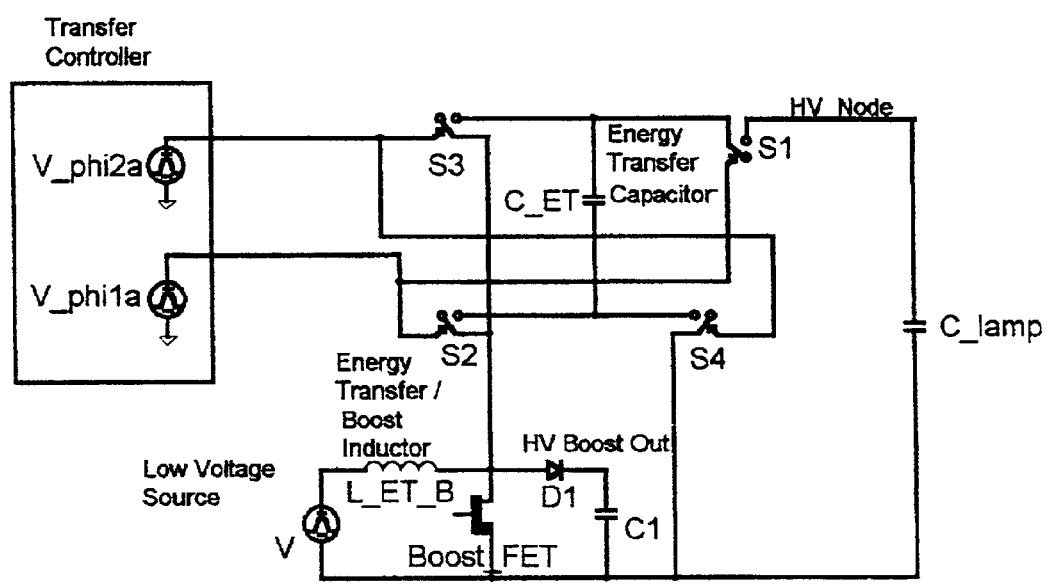
FIG. 14 is a schematic diagram of an electro-luminescent lamp driver circuit employing a low voltage switch mode method of energy recovery, integrated with a boost converter, in accordance with another embodiment of the present invention.

In an alternative embodiment of the circuit of FIG. 8, inductor L_ET can serve as a boost converter inductor L_ET_B, as illustrated in FIG. 14. In this arrangement, a first topology involving inductor L_ET_B, in combination with a switch Boost_FET, forms a step up converter. Alternatively, a second topology involving inductor L_ET_B in combination with capacitor C_ET, switches S1–S4, and a transfer controller, forms a low voltage energy recovery circuit. For example, consider a system which repetitively uses two operational phases to produce an AC waveform across capacitor C_lamp. In a first phase, the first topology described above is employed, whereby capacitor C_lamp is charged by the output of the step up converter, possibly through a switching bridge, as illustrated in FIG. 1. In a second phase, the second topology described above is employed, and capacitor C_lamp is discharged by the energy recovery topology and method illustrated in FIG. 8. These two phases are repeated at a certain rate, causing the voltage across capacitor C_lamp to rise and fall at a desired frequency.

We claim:

1. A method for recovering energy stored on an electro-luminescent lamp panel, the method comprising:

applying a first voltage present across the electro-luminescent lamp panel to an input of a switch-mode energy conversion circuit;

operating the switch-mode energy conversion circuit to transform energy representative of said first voltage to a second voltage that is higher than said first voltage;

applying said second voltage to a storage device; and delivering energy stored in said storage device back to said electro-luminescent lamp panel.

2. A method for recovering energy stored on an electro-luminescent lamp panel, the method comprising:

applying a first voltage present across the electro-luminescent lamp panel to an input of a switch-mode energy conversion circuit;

operating the switch-mode energy conversion circuit to transform energy representative of said first voltage to a second voltage that is higher than said first voltage;

applying said second voltage to a storage device; and delivering energy stored in said storage device to an electro-luminescent lamp panel driver circuit.

3. A method for recovering energy stored on an electro-luminescent lamp panel, the method comprising:

applying a first voltage present across the electro-luminescent lamp panel to an input of a switch-mode energy conversion circuit;

operating the switch-mode energy conversion circuit to transform energy representative of said first voltage to a second voltage that is higher than said first voltage;

applying said second voltage to a storage device; and delivering energy stored in said storage device back to said electro-luminescent lamp panel and to an electro-luminescent lamp panel driver circuit.

4. A method for recovering energy stored on an electro-luminescent lamp panel, the method comprising:

applying a first voltage present across the electro-luminescent lamp panel to an input of a switch-mode energy conversion circuit;

operating the switch-mode energy conversion circuit to transform energy representative of said first voltage to a current;

delivering said current to a source of operating voltage for said electro-luminescent lamp panel to thereby realize a reduction in average output current required from said source of operating voltage to operate said electro-luminescent lamp panel.

5. The method as in claim 4, further comprising the step of controlling an amplitude versus time characteristic of said current delivered to said source of operating voltage.

* * * * *